United States Patent [19]

Sasaki et al.

[11] 4,180,607

[45] Dec. 25, 1979

[54] EPOXY RESIN COMPOSITION AND METHOD FOR CURING THE EPOXY RESIN COMPOSITION

[75] Inventors: Ichiro Sasaki; Hiroshi Itatani; Mikito Kashima, all of Chiba, Japan

[73] Assignee: Ube Industries, Ltd., Yamaguchi, Japan

[21] Appl. No.: 938,526

[22] Filed: Aug. 31, 1978

[30] Foreign Application Priority Data

Jul. 7, 1978 [JP] Japan .................................. 53-81943

[51] Int. Cl.$^2$ ............................................. C08G 59/42
[52] U.S. Cl. .................................. 528/112; 528/113; 528/115; 528/341; 528/361; 528/365

[58] Field of Search ............... 528/112, 113, 115, 341, 528/361, 365

[56] References Cited

U.S. PATENT DOCUMENTS

| | | | |
|---|---|---|---|
| 3,502,609 | 3/1970 | Barie et al. | 260/37 |
| 3,891,633 | 6/1975 | Berlin et al. | 260/240 G |

*Primary Examiner*—Earl A. Nielsen
*Attorney, Agent, or Firm*—Burgess, Ryan and Wayne

[57] ABSTRACT

Disclosed is an epoxy resin composition containing, as an essential curing component, 2,3,3',4'-biphenyltetracarboxylic dianhydride which is highly compatible with epoxy resins at a relatively low temperature and effective for producing cured epoxy resins having an excellent thermal resistance.

24 Claims, No Drawings

EPOXY RESIN COMPOSITION AND METHOD FOR CURING THE EPOXY RESIN COMPOSITION

FIELD OF THE INVENTION

The present invention relates to an epoxy resin composition and a method for curing the epoxy resin composition. More particularly, the present invention relates to an epoxy resin composition useful for producing cured epoxy resins having excellent thermal, mechanical and electrical properties and a method for curing the epoxy resin composition.

BACKGROUND OF THE INVENTION

It is known that various monoanhydrides of organic carboxylic acids, for example, maleic acid, phthalic acid, methyl-3,6-endomethylene tetrahydrophthalic acid and hexahydrophthalic acid, are useful as a curing agent for producing cured epoxy resins having a high thermal resistance. However, it is also known that when the epoxy resins are cured by using the above-mentioned conventional organic carboxylic monoanhydrides, the thermal resistance of the resultant cured epoxy resins is not always satisfactorily high for practical use at a high temperature. Furthermore, numerous articles in published literature relate to the fact that various dianhydrides of organic carboxylic acids, for example, pyromellitic acid and 3,3',4,4'-benzophenonetetracarboxylic acid, are useful as a curing agent for producing the cured epoxy resin having a high thermal resistance. However, the above-mentioned conventional organic carboxylic dianhydrides can be dissolved in the epoxy resins only at a temperature higher than the curing temperature of the epoxy resins or have a poor compatibility with the epoxy resins. That is, when the curing agent consists of the conventional carboxylic acid dianhydride alone, the curing agent can be completely dissolved only at a temperature of 190° C. or more. Even when the curing agent can be completely dissolved in the epoxy resin, the resultant solution is so unstable that the entire amount or a portion of the solution is rapidly gelled at the dissolving temperature. Sometimes, when the solution is cooled and reaches a temperature of 180° C. or less, the curing agent consisting of the conventional organic carboxylic dianhydride undesirably deposits from the solution. When the above-mentioned deposition of the curing agent occurs, the curing of the mixture of the epoxy resin with the curing agent results in formation of cracks in the resin during the curing operation or the resultant cured epoxy resin is brittle and has a poor tenacity. In order to prevent the deposition of the curing agent consisting of the conventional organic carboxylic dianhydride from the epoxy resin solution, it is necessary to mix a considerable amount of the conventional organic carboxylic monoanhydride and/or a non-reactive diluent. The monoanhydride and the non-reactive diluent are effective for lowering the temperature at which the curing agent can be completely dissolved in the epoxy resin and the temperature at which the curing agent can be completely dissolved in the epoxy resin and the temperature at which the curing agent can be deposited from the epoxy resin solution. However, the resultant cured epoxy resin, which contains a considerable amount of the conventional organic carboxylic monoanhydride and/or the non-reactive diluent, has a poor thermal resistance at a high temperature. Under the above-mentioned circumstances, a new curing agent which is highly compatible with the epoxy resins and capable of producing cured epoxy resins having an excellent thermal resistance even at a high temperature is strongly desired.

SUMMARY OF THE INVENTION

An object of the present invention is to provide an epoxy resin composition containing a curing agent which has a high compatibility with the epoxy resin at a relatively low temperature, and a method for curing an epoxy resin composition by using the curing agent.

Another object of the present invention is to provide an epoxy resin composition containing a curing agent which is effective for producing cured epoxy resins having excellent thermal, mechanical and electrical properties, and a method for curing an epoxy resin composition by using the curing agent. The above-mentioned objects can be attained by the epoxy resin composition of the present invention, which comprises at least one epoxy resin and a curing agent which comprises, as an essential curing component, 2,3,3',4'-biphenyltetracarboxylic dianhydride.

Also, the method of the present invention comprises the steps of mixing at least one epoxy resin and a curing agent which comprises, as an essential curing component, 2,3,3',4'-biphenyltetracarboxylic dianhydride; heating said resultant composition at a temperature of from 100° to 170° C. to dissolve the curing agent in the epoxy resin, and; curing the above-heated epoxy resin composition at a temperature of from 80° C. to 300° C.

DETAILED DESCRIPTION OF THE INVENTION

In the curing agent useful for the epoxy resin composition of the present invention, the essential curing component consists of 2,3,3',4'-biphenyltetracarboxylic dianhydride of the formula:

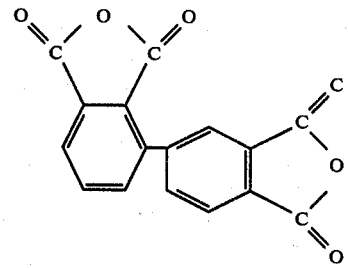

The above-formulated compound may be prepared by any conventional methods. For example, O-phthalic diester is converted into 2,3,3',4'- and 3,3',4,4'-biphenyltetracarboxylic ester dimers in the presence of a palladium type catalyst and molecular oxygen at a high temperature under a high pressure; the biphenyltetracarboxylic ester dimers are hydrolyzed, and; then, the resultant 2,3,3',4'-biphenyltetracarboxylic acid is isolated from the reaction mixture and, dehydrated to prepare 2,3,3',4'-biphenyltetracarboxylic dianhydride. Another example would be that O-xylene is converted into 2,2,3',4'- and 3,3',4,4'-biphenyltetramethyl dimers in the presence of a palladium type catalyst and molecular oxygen at a high temperature under a high pressure; the biphenyltetramethyl dimers are oxidized so as to convert the methyl groups into carboxyl groups, and; then, the resultant 2,3,3',4'-biphenyltetracarboxylic acid is isolated from the reaction mixture and dehydrated to prepare 2,3,3',4'-biphenyltetracarboxylic dianhydride.

In the above-mentioned methods for preparing 2,3,3',4'-biphenyltetracarboxylic dianhydride, the dehydration product may contain a small amount of a by-product consisting of 3,3',4,4'-biphenyltetracarboxylic dianhydride. However, in the curing agent, it is preferable that the 2,3,3',4'-biphenyltetracarboxylic dianhydride have a degree of purity of at least 90%, more preferably, at least 95% by weight.

The curing agent in the epoxy resin composition of the present invention may consist of the essential curing component, that is, 2,3,3',4'-biphenyltetracarboxylic dianhydride, alone or may contain one or more additional curing components in addition to the essential curing component. The additional curing component can be selected from conventional hardening compounds for the epoxy resins, for example, the group consisting of mono-anhydrides of organic dicarboxylic acids, dianhydrides of organic tetracarboxylic acids different from 2,3,3',4'-biphenyltetracarboxylic dianhydride, and, aromatic polyamines. The monoanhydrides of the dicarboxylic acids are most preferable additional curing components. The additional curing monoanhydride component is selected from the group consisting of monoanhydrides of maleic acid, phthalic acid, methyl-3,6-endomethylene tetrahydrophthalic acid, 3,6-endomethylene tetrahydrophthalic acid, tetrahydrophthalic acid, hexahydrophthalic acid, dodecylsuccinic acid and dichlorosuccinic acid. The additional curing dianhydride component may be selected from the group consisting of dianhydrides of pyromellic acid, 3,3',4,4'-benzophenonetetracarboxylic acid, 3,3',4,4'-biphenyltetracarboxylic acid, butanetetracarboxylic acid, bis(3,4-dicarboxyphenyl) methane and bis(3,4-dicarboxyphenyl) ether. The additional curing aromatic polyamine is selected from the group consisting of m- and p-phenylene diamines, 4,4'-diaminodiphenylmethane, 4,4'-diamimodiphenylether and 4,4'-diaminodiphenylsulfone.

In the method of the present invention, the curing agent comprising, as an essential hardening agent, 2,3,3',4'-biphenyltetracarboxylic dianhydride is mixed with at least one epoxy resin. The resultant composition is heated at a temperature of from 100° to 170° C. to dissolve the curing agent in the epoxy resin. When the curing agent consists of the essential hardening component alone, the curing agent can be dissolved into the epoxy resins at a temperature of from 150° to 170° C. However, when the curing agent contains the additional curing monoanhydride component in addition to the essential curing component, the curing agent can be dissolved into the epoxy resins at a temperature of from 100° to 170° C. In either case, the curing agent can be completely and uniformly dissolved in the epoxy resins, and the resultant solution is so stable that even when the solution is cooled to a temperature of 100° C. or less, or even when the cooling causes the solution to be solidified, the curing agent is never deposited from the solution.

The epoxy resin composition of the present invention containing the curing agent can be cured at a temperature of 80° to 300° C. in accordance with any conventional curing operation. When the curing agent consists of the essential curing component alone, the cured epoxy resin composition has a heat deflection temperature of about 200° C. or more. The heat deflection temperature can be increased to 220° C. or more by heat treating the cured epoxy resin composition. In the case whre the curing agent consists of the essential curing component and at least one additional curing monoanhydride component, the curing epoxy resin composition has a heat deflection temperature of about 150° C. or more, usually, about 170° C. or more. That is, the cured epoxy resins can be heat-treated at a temperature of about 200° C. for 20 hours or more substantially without change in quality. The physical properties of the heat-treated cured epoxy resins are substantially the same as those of the cured epoxy resins. Also, it should be noted that the above-mentioned heat-treatment, which is very severe with regard to the epoxy resins, causes very little reduction in the weight of the cured epoxy resins. Also it has found that the electrical properties, for example, dielectric constant, dielectric loss tangent and volume resistivity of the cured epoxy resins are all at a high level, and are substantially not affected even by a treatment of the cured epoxy resins with hot water at a temperature of about 100° C.

In the case where, the curing agent consists of the essential curing component alone, it is preferable that the ratio of the amount, in terms of acid anhydride equivalent, of the essential curing component to the amount, in terms of epoxy equivalent, of the epoxy resin be in a range of from 0.2 to 1.5, more preferably, from 0.25 to 1.4; the ratio being calculated in accordance with the formula (I):

$$\text{Ratio} = \frac{A/A'}{B/B'} \quad (I)$$

wherein A represents an amount in grams of the essential curing component, A' represents a value of acid anhydride equivalent of the essential curing component, B represents an amount in grams of the epoxy resin and B' represents a value of epoxy equivalent of the epoxy resin. Generally, the value of acid anhydride equivalent of an organic carboxylic anhydride can be obtained by dividing the value of the molecular weight of the organic carboxylic anhydride by the number of the anhydride groups contained in the organic carboxylic anhydride molecule. For example, in the case of a carboxylic dianhydride, the value of the acid anhydride equivalent thereof corresponds to one-half the value of the molecular weight of the carboxylic dianhydride. In the case of a carboxylic monoanhydride, the value of the acid anhydride equivalent thereof corresponds to the value of the molecular weight of the carboxylic monoanhydride.

The value of the epoxy equivalent of the epoxy resin is calculated by dividing the value of the average molecular weight of the epoxy resin by the average number of the epoxy groups contained in the molecule of the epoxy resin.

In the present invention, the larger the ratio of the formula (I), the higher the thermal resistance of the resultant cured epoxy resin. If the ratio of the formula (I) is less than 0.2, the resultant cured epoxy resin will have a very poor thermal resistance. However, the use of the curing agent in a ratio of the formula (I) greater than 1.5 will result in no improvement or decrease in the thermal resistance or mechanical properties of the resultant cured epoxy resin in comparison with that obtained by using the curing agent in a ratio of the formula (I) of 1.5. When the essential curing component is used in a high ratio of the formula (I) of from 0.45 to 1.5, more particularly, 0.5 to 1.4, no additional curing component is required to be used in addition to the essential curing component. That is, the resultant cured epoxy resin has a very high heat-deflection temperature of about 200° C. or more. Also, the cured epoxy resin has an excellent thermal stability. For example, even when a cured epoxy resin article produced by using the curing agent is heat-treated at a temperature of 200° C. for 24 hours, the loss in weight of the cured epoxy resin article is very small, that is, 0.1% or less, and the shrinkage in volume of the cured epoxy resin article is also very small, that is, 0.01% or less.

In the case where, the essential curing component of the present invention is used in a relatively small ratio of the formula I of from 0.2 to 1.0, more particularly, from 0.25 to 0.9, and even more particularly, from 0.3 to 0.85, the curing agent may comprise one or more additional curing components in addition to the essential curing component. In this case, it is preferable that the sum of the ratio of the amount in terms of acid anhydride equivalent of the essential curing component used to the amount in terms of epoxy equivalent of the epoxy resin used and the ratio of the amount in terms of acid anhydride equivalent of the additional monoanhydride curing component to the amount in terms of epoxy equivalent of the epoxy resin used is in a range of from 0.45 to 1.4 more preferably, from 0.5 to 1.2, and most preferably, from 0.55 to 1.0. The latter ratio is calculated in accordance with the formula (II):

$$\text{Ratio} = \frac{C/C'}{B/B'} \quad \text{(II)}$$

wherein B/B' is the same as that defined above, C represents an amount in grams of the additional monoanhydride curing component used and C' represents a value of the molecular weight of the additional monoanhydride curing component. That is, the value of C/C' corresponds to that of the amount in terms of mole of the additional monoanhydride curing component used. The ratio of the formula (II) is preferably 0.9 or less, more preferably, 0.8 or less, and most preferably, 0.6 or less.

In the curing agent usable for the present invention, the addition of the additional monoanhydride curing component to the essential curing agent is effective for causing the curing agent to be completely dissolved in the epoxy resin at a relatively low temperature. Accordingly, the curing agent comprising the additional monoanhydride curing component, in addition to the essential curing component, is suitable for curing the epoxy resins at a relatively low temperature, which is most preferable for industrial practice. However, the increase in the ratio of the formula (II) causes the thermal resistance of the resultant cured epoxy resin to be decreased; whereas in some cases the above-mentioned increase might affect some physical properties other than the thermal resistance, for example, bending strength to be improved. Especially, in the case where the ratio of the formula (II) is more than 0.9, the physical properties and the thermal reinstance of the resultant cured epoxy resin are all significantly reduced.

As the additional curing component, one or more of the additional dianhydride curing components and additional aromatic polyamine curing components can be used in addition to the essential curing component alone or both the essential curing component and the additional monoanhydride curing component. However, the additional dianhydride curing component can be dissolved in the epoxy resins at a relatively high temperature, and the dissolved additional dianhydride curing component tends to readily deposit from the epoxy resin. Accordingly, it is not preferable that the additional dianhydride curing component be contained in a large amount in the curing agent usable for the present invention. Usually, it is preferable that the additional dianhydride curing component be used in an amount of 0.1 mole or less, more preferably, 0.05 mole or less, per epoxy equivalent of the epoxy resin, in the curing epoxy resin composition.

The epoxy resin usable for the present invention is not limited to a special type of epoxy resin. It is preferable that the epoxy resin have an average molecular weight of from 100 to 20,000 and an average value of epoxy equivalent of from 50 to 5000. The epoxy resins may be selected from the group consisting of liquid and solid bispenol A type epoxy resins which are prepared from bisphenol A and epichlorohydrin; halogenated bisphenol A type epoxy resins which are prepared from halogenated bisphenol A and epichlorohydrin; bisphenol F type epoxy resins which are prepared from bisphenol F and epichlorohydrin; resorcinol type epoxy resins which are prepared from resorcinol and epichlorohydrin; novolak type epoxy resins which are prepared from novolak resin and epichlorohydrin; polyolefin type epoxy resins whihc are prepared from epoxidized polyolefins; alicyclic type epoxy resins which are prepared from epoxidized alicyclic compounds and; mixtures of two or more of the above-mentioned epoxy resins.

The bisphenol A type epoxy resins preferably have an average molecular weight of from 200 to 10,000 and an average value of the epoxy equivalent of from 100 to 3000.

In the method of the present invention, the curing epoxy resin composition may contain, in addition to the curing agent and the epoxy resin, 15% based on the weight of the epoxy resin or less of one or more reactive diluents, for example, glycidyl acrylate, phenylglycidyl ether, n-butylglycidylether, styrene oxide, allylglycidylether and glycerol type epoxy reins which are prepared from epoxidized glycerol. Furthermore, the curing epoxy resin composition may contain, in addition to the curing agent and the epoxy resin, one or more additives, for example, curing accelerators for the epoxy resins, non-reactive diluents for the epoxy resin, fillers, coloring materials, and modifying agents for the epoxy resins.

The above-mentioned curing accelerators for the epoxy resins are preferably selected from amine compounds, for example, diethylenetriamine, triethylenetetramine, diethyleneaminopropylamine, N-aminoethylpiperazine, benzyldimethylamine and tris (dimethylaminomethyl) phenol. The most preferable curing accelerators for the method of the present invention are tris (dimethylaminomethyl) phenol and benzyldimethylamine.

The above-mentioned amine compounds are known to be effective for curing the epoxy resins at room temperature. Also, it is known that the amine compounds are effective for accelerating the initial stage of the curing reaction of the epoxy resins. Accordingly, in the method of the present invention, the amine compounds can be used in an amount of 1.0% or less, preferably, 0.001 to 0.5%, based on the weight of the epoxy resin, in order to control the curing temperature and time. The curing temperature and time are variable in response to the type of epoxy resin, the type and content of the additional curing component and the type and content of the curing accelerator. However, the use of the curing accelerater in a large amount of more than 1% may cause the curing mixture to be gelatinized at a relatively low temperature of from 80° to 150° C. less than one minute after the start of the curing operation.

The non-reactive diluents for the epoxy resins may be selected from aromatic hydrocarbon solvents, for example, toluene and xylene, and aromatic ester plasticizers, for example, butyl phthalate, dioctyl phthalate and tricresyl phosphate.

The fillers for the epoxy resins may be selected from inorganic extenders, for example, crushed stone, sand, silica, talc and calcium carbonate; reinforcing fillers, for example, asbestos, fine glass grains, glass fibers and carbon fibers; fillers for special purpose, for example, powdered quartz, graphite, powdered ceramics, alumina and silica gel; metallic fillers, for example, powdered aluminium, aluminium oxide, iron, iron oxides and copper; inorganic oxides, for example, antimoney oxide, titanium dioxide and barium titanate, and; fine plastic beads made of a phenol resin or urea resin.

The modifying agent for the epoxy resins can be selected from polyamide resins, polyimide resins, polysulfide resins, triphenylphosphite and coal tar.

The curing agent can be mixed into the epoxy resins in accordance with any conventional methods which are utilized for mixing the conventional curing agents into the epoxy resins. It is preferable that the essential curing component be in the form of fine particles having an average size of from 0.1 to 1000 microns, more preferably, from 0.5 to 500 microns, most preferably, 0.5 to 50 microns, because the smaller the particle size of the essential curing component, the shorter the dissolving time necessary for the essential curing component. Sometimes, in the method of the present invention it is not preferable to carried out the dissolving operation at a high temperature of 190° C. or more, because the high temperature might cause the entire amount or a portion of the curing mixture to be gelled within about 2 minutes or less.

In the method of the present invention, the mixture of the epoxy resin and the curing agent may be cured in accordance with a conventional method which is usable for curing the epoxy resin by using a conventional curing agent. For example, it is preferable that the curing operation be carried out, first, at a temperature of from 80° to 170° C. more preferably, from 100° to 150° C. for from 0.1 to 30 hours, more preferably, from 0.5 to 20 hours, and finally, at a temperature of from 150° to 250° C. more preferably, from 170° to 220° C. and not lower than the first curing temperature for 0.1 to 30 hours, more preferably, 0.2 to 15 hours. The above-mentioned first step of the curing operation may be divided into two stages. In this case, the curing hardening operation is carried out, first at a temperature of from 80° to 130° C. second at a temperature of from 130° to 170° C. and finally, at a temperature of from 150° to 250° C. and not lower than the second curing temperature.

When the curing mixture contains no curing accelerator, the curing mixture is relatively stable at a temperature of 80° C. or less and, therefore, can be stored for a long period of time without gelation thereof.

The curing agent usable for the present invention comprises the essential curing component, that is, 2,3,3',4'-biphenyltetracarboxylic dianhydride, which is highly compatible with the epoxy resin, and useful for producing the cured epoxy resins having an excellent thermal resistance. Therefore, the epoxy resin composition and the method of the present invention are useful for producing shaped articles, laminates, coating layers and bonding layers of the cured epoxy resin having a high thermal resistance. When an epoxy resin is in the state of a solid at a room temperature, the curing agent may be mixed with the solid epoxy resin to prepare a curing epoxy resin composition powder.

The present invention is further illustrated by the following examples and comparison examples.

In the examples and comparison examples, the following test methods were used.

1. Dissolving temperature and gelatinizing time

The dissolving temperature of curing agent in epoxy resin and gelatinizing time of curing epoxy resin composition were determined by using an apparatus for measuring curing time described in Japanese Industrial Standard C 2104. In the determination of the dissolving temperature, a heating plate having a cavity was heated, a mixture of an epoxy resin and a curing agent was placed in the cavity, and the temperature of the mixture at which the mixture was completely converted into a clear solution within a few seconds was determined. In the determination of the gelatinizing time, the clear solution of the epoxy resin mixture was maintained at a predetermined temperature, for example, 160°, 170° or 180° C. a needle was repeatedly immersed into and withdrawn from the melt so as to form a thin thread of the melt between the lower end of the needle and the surface of the melt, and when the thread was broken due to the gelatinization of the melt, the time from the start of the test to the moment at which the thread was broken was determined.

2. Bending strength and Barcol hardness

A curing agent was dissolved in an epoxy resin to prepare a curing composition. The composition was cured, first, at a temperature of 120° C. for 24 hours and, finally, at a temperature of 200° C. for 2 hours. The resultant test piece of cured epoxy resin was divided into two pieces. One of the cured epoxy resin test pieces was heat-treated at a temperature of 200° C. for 24 hours. The bending strength of each of the epoxy resin test pieces was determined in accordance with ASTM-D790. Also, the Barcol hardness of each of the epoxy resin test pieces was determined in accordance with ASTM D 2583 by using a Barcol impressor.

3. Heat-deflection temperature

The same cured and heat-treated epoxy resin test pieces as those mentioned above were prepared. The heat deflection temperature of each test piece was determined in accordance with ASTM D 648 at a fiber stress of 18.6 kg and at a heating rate of 2° C./min.

4. Loss in weight due to heating

The loss in weight of the cured epoxy resin due heat-treatment was determined in accordance with the following equation.

$$\text{Loss in weight (\%)} = \frac{W_0 - W}{W_0} \times 100$$

wherein $W_0$ stands for the weight of a cured epoxy resin piece which was prepared by the above-mentioned curing process and W stands for the weight of a cured and heat-treated epoxy resin piece which was prepared by the above-mentioned cured and heat-treating process.

5. Shrinkage in volume

The shrinkage in volume of the epoxy resin was determined in accordance with the following equation:

$$\text{Shrinkage in volume (\%)} = \left(\frac{1}{A} - \frac{1}{B}\right) \times \frac{A}{100}$$

wherein A stands for a specific gravity of a composition consisting of an epoxy resin and a curing agent dissolved in the epoxy resin, and B stands for a specific gravity of a cured epoxy resin piece which was prepared by the above-mentioned curing process.

EXAMPLES 1 to 8

In each of the Examples 1 to 8, 100 parts by weight of a bisphenol A type epoxy resin (Epicoat 828, a trademark of Shell Chemical Co., Japan), having a viscosity of 110 to 150 poises, an epoxy equivalent of 190 and an average molecular weight of 355, were mixed with powdered 2,3,3',4'-biphenyltetracarboxylic dianhydride, having an average particle size of about 10 microns, in an amount (parts by weight) shown in Table 1, and a powdered organic corboxylic monoanhydride shown in Table 1 in an amount (parts by weight) shown in Table 1, to form a dispersion. The mixture was heated to determine the dissolving temperature of the curing agent. The mixture was converted to a clear solution at the dissolving temperature. The clear solution of the epoxy resin composition was subjected to the test for determining the gelatinizing time of the solution at each of the temperatures of 160° and 170° C. The results are shown in Table 1.

EXAMPLES 9 to 12

In Example 9, the same procedures as those mentioned in Examples 1 to 8 were carried out, except that the bisphenol A type epoxy resin (Epicoat 828) of Example 1 was substituted by a bisphenol A type epoxy resin (Epicoat 1004, a trademark of Shell Chemical Co., Japan) which was in the state of a solid and had an epoxy equivalent of 1000 and an average molecular weight of 1400.

The mixture was subjected to the tests for determining the dissolving temperature of the hardening agent and the gelatinizing time of the solution of the epoxy resin composition.

In Example 10, the same procedures as those mentioned in Examples 1 to 8 were carried out, except that a novolak type epoxy resin (Epicoat 153, a trademark of Shell Chemical Co. Japan), having a viscosity of 1400 to 2000 poises, an epoxy equivalent of 175 and an average molecular weight of 370, was used in place of the hisphenol A type epoxy resin (Epicoat 828).

In Example 11, the same procedures as those described in Examples 1 to 8 were carried out, except that an alicyclic type epoxy resin (Chissonox 212, a trademark of Chisso Ltd.), having a viscosity of 514, an epoxy equivalent of 135 and an average molecular weight of 252, was used in place of the hisphenol A type epoxy resin of Example 1.

In Example 12, procedures identical to those described in Examples 1 to 8 were carried out, except that a halogenated epoxy resin (DER 542, a trademark of Dow Chemical Co., Ltd.), having an epoxy equivalent of 400 and being in a semi-solid state. The properties of the resultant non-cured epoxy resin compositions are shown in Table 1.

The non-cured epoxy resin composition of Example 9 was in the state of a solid at a room temperature. Therefore, by finely dividing the composition, a non-adhesive epoxy resin composition powder was obtained. This composition was useful as a powder paint.

Table 1

| Ex. No. | Epoxy resin Type | Epoxy equivalent | Essential curing component Amount (part by weight) | Ratio of formula (I) | Additional monoanhydride curing component Type | Amount (part by weight) | Ratio of formula (II) | Dissolving temperature of curing agent in epoxy resin (°C.) | Gelatinizing time (sec) 160° C. | 170° C. | Depositing temperature of curing agent during process of cooling to room temperature (°C.) |
|---|---|---|---|---|---|---|---|---|---|---|---|
| 1 | Epicoat 828 | 190 | 65.7 | 0.85 | — | — | — | 165 | — | 560 | |
| 2 | Epicoat 828 | 190 | 42.5 | 0.55 | — | — | — | 160 | 1080 | — | |
| 3 | Epicoat 828 | 190 | 52.2 | 0.57 | MA | 14.4 | 0.28 | 150 | — | — | |
| 4 | Epicoat 828 | 190 | 32.9 | 0.42 | MA | 21.9 | 0.43 | 135 | 900 | — | No deposit from composition was found during cooling process. |
| 5 | Epicoat 828 | 190 | 21.9 | 0.28 | MA | 29.2 | 0.57 | 120 | — | — | |
| 6 | Epicoat 828 | 190 | 16.4 | 0.21 | MA | 32.9 | 0.64 | 110 | — | — | |
| 7 | Epicoat 828 | 190 | 32.9 | 0.42 | PA | 33.5 | 0.43 | 140 | 1190 | — | |
| 8 | Epicoat 828 | 190 | 32.9 | 0.42 | MNA | 40.3 | 0.43 | 130 | 1380 | — | |
| 9 | Epicoat 1004 | 1000 | 13.2 | 0.85 | — | — | — | 155 | 690 | — | |
| 10 | Epicoat 152 | 175 | 71.4 | 0.85 | — | — | — | 162 | — | 1000 | |
| 11 | Chissonox 221 | 135 | 91.2 | 0.85 | — | — | — | 167 | — | 320 | |
| 12 | DER 542 | 400 | 35.7 | 0.85 | — | — | — | 167 | — | 1580 | |

Note:
MA: maleic anhydride
PA: phthalic anhydride
MNA: methyl-3,6-endomethylenetetrahydrophthalic anhydride Table 1 shows that the curing agents of the present invention are highly compatible with the epoxy resins and very stable in the epoxy resin composition. Also, Table 1 illustrates that the curing agents of the present invention are highly effective for preventing the epoxy resin composition from undesirable gelatinization.

COMPARISON EXAMPLES 1 TO 14

In each of Comparison Examples 1 to 14, a mixture of an epoxy resin shown in Table 2 and a conventional curing agent shown in Table 2 was prepared in a composition shown in Table 2. The dissolving temperature of the curing agent and the gelatinizing times at temperatures of 160° and 180° C. of the epoxy resin composition are shown in Table 2.

pieces of the first group, which consisted of the cured epoxy resin, remained without additional treatment and were referred to as first test specimens. The pieces of Table 2

| | | Curing Agent | | | | | | Properties of epoxy resin composition | | |
|---|---|---|---|---|---|---|---|---|---|---|
| | | Organic carboxylic dianhydride | | | Organic carboxylic monoanhydride | | | Dissolving temperature | Depositing temperature of curing agent during process of cooling to room temperature (°C.) | Gelatinizing time (sec) | |
| Ex. No. | Type of epoxy resin (100 parts by weight) | Type | Amount (parts by weight) | Ratio of formula (II) | Type | Amount (parts by weight) | Ratio of formula (II) | of curing agent in epoxy resin (°C.) | | 160° C. | 180° C. |
| 1 | Epicoat 828 | s-BPDA | 65.7 | 0.85 | — | — | — | 23 | gelatinized | gelatinized at 263° C. | gelatinized at 263° C. |
| 2 | Epicoat 828 | " | 32.9 | 0.42 | MA | 21.9 | 0.43 | 230 | " | gelatinized at 230° C. | gelatinized at 230° C. |
| 3 | Epicoat 828 | " | 32.9 | 0.42 | PA | 33.5 | 0.43 | 225 | 210 | deposited at 210° C. | deposited at 210° C. |
| 4 | Epicoat 828 | PMDA | 48.8 | 0.85 | — | — | — | 225 | gelatinized | gelatinized at 225° C. | gelatinized at 225° C. |
| 5 | Epicoat 828 | " | 31.1 | 0.55 | — | — | — | 220 | " | gelatinized at 220° C. | gelatinized at 220° C. |
| 6 | Epicoat 828 | " | 16.2 | 0.28 | MA | 29.2 | 0.57 | 163 | 150 | — | 400 |
| 7 | Epicoat 828 | " | 12.2 | 0.21 | MA | 32.9 | 0.64 | 153 | 100 | — | — |
| 8 | Epicoat 828 | " | 24.4 | 0.42 | PA | 33.5 | 0.43 | 180 | 160 | deposited at 160° C. | 340 |
| 9 | Epicoat 828 | BTDA | 72.9 | 0.85 | — | — | — | 200 | 195 | deposited at 195° C. | deposited at 195° C. |
| 10 | Epicoat 828 | " | 46.6 | 0.55 | — | — | — | 195 | 185 | deposited at 185° C. | deposited at 185° C. |
| 11 | Epicoat 828 | " | 36.0 | 0.42 | MA | 21.9 | 0.43 | 170 | 150 | — | 1410 |
| 12 | Epicoat 828 | " | 24.0 | 0.28 | MA | 29.2 | 0.57 | 155 | 120 | — | — |
| 13 | Epicoat 828 | " | 18.0 | 0.21 | MA | 32.9 | 0.64 | 145 | 90 | — | — |
| 14 | Epicoat 828 | " | 36.0 | 0.42 | PA | 33.5 | 0.43 | 170 | 155 | — | 1380 |

Note:
S-BPDA: 3,3',4,4'-biphenyltetracarboxylic dianhydride
PMDA: Pyromellitic diaphdride
BTOA: 3,3',4,4'-benzophenonetetracarboxylic dianhydride Table 2 shows that the compatibility of the conventional curing agents with the epoxy resin is so poor that the curing agents deposit from the epoxy resin solution at relatively high temperatures during the cooling process. Also, the epoxy resin solutions containing the conventional curing agents are very unstable at a temperature of 160° C.

EXAMPLES 13 TO 20 AND COMPARISON EXAMPLE 15 TO 19

In each of the Examples 13 to 20, the epoxy resin composition which had been prepared by the same method as that mentioned in the example shown in Table 3, cured, first, at a temperature of 120° C. for 24 hours and, finally, at a temperature of 200° C. for 2 hours to prepare a number of pieces of cured epoxy resin. The pieces were divided into three groups. The pieces of the second group were heat-treated at a temperature of 200° C. for 10 hours. The resultant heat-treated pieces were referred to as second test specimens. The pieces of the third group were heat-treated at a temperature of 200° C. for 24 hours. The resultant heat-treated pieces were referred to as third test specimens.

The test specimens of each of the groups were subjected to the bending strength test, heat-deflection test, Barcol hardness test, weight loss test and shrinkage test. The results are shown in Table 3.

In each of Comparison Examples 15 to 19, the same procedures as those mentioned in Example 13 to 20 were carried out, except that the epoxy resin composition to be cured had been prepared by the same method as that mentioned in the comparison example shown in Table 3. The results are shown in Table 3.

Table 3

| | | Bending test | | | | Heat-deflection test | | Barcol hardness test | | Weight-loss test | Shrinkage test |
|---|---|---|---|---|---|---|---|---|---|---|---|
| | | Bending strength (kg/mm²) | | Bending modulus of elasticity (kg/mm²) | | Heat-deflection temperature (°C.) | | Barcol hardness | | Weight loss (%) | Shrinkage in volume (%) |
| | | Test specimen | | Test specimen | | Test specimen | | Test specimen | | Test specimen | Test specimen |
| Example No. | Epoxy resin composition prepared in | First group | Third group | First group | Third group | First group | Second group | First group | Third group | First group | First group |
| Example 13 | Example 1 | 8.3 | 8.9 | 339 | 334 | 182 | 220 or more | 55 | 55 | 0.08 | — |
| Example 14 | Example 2 | 9.8 | 10.6 | 326 | 331 | 220 or more | 220 or more | 57 | 57 | 0.09 | 0.00 |
| Example 15 | Example 4 | 10.7 | 10.8 | 298 | 316 | 187 | 220 | 52 | 52 | 0.09 | 1.33 |

Table 3-continued

| Example No. | Epoxy resin composition prepared in | Bending test | | | | Heat-deflection test | | Barcol hardness test | | Weight-loss test | Shrinkage test |
|---|---|---|---|---|---|---|---|---|---|---|---|
| | | Bending strength (kg/mm²) | | Bending modulus of elasticity (kg/mm²) | | Heat-deflection temperature (°C.) | | Barcol hardness | | Weight loss (%) | Shrinkage in volume (%) |
| | | Test specimen | | Test specimen | | Test specimen | | Test specimen | | Test specimen | Test specimen |
| | | First group | Third group | First group | Third group | First group | Second group | First group | Third group | First group | First group |
| Example 16 | Example 5 | 10.3 | 10.1 | 296 | 292 | 181 | 197 | 50 | 50 | 0.11 | 1.50 |
| Example 17 | Example 6 | 10.9 | 8.0 | 278 | 283 | 170 | 173 | 49 | 49 | 0.16 | — |
| Example 18 | Example 10 | 11.1 | — | 356 | — | 200 or more | — | — | — | — | — |
| Example 19 | Example 11 | 8.5 | — | 424 | — | 180 | — | — | — | — | — |
| Example 20 | Example 12 | 10.3 | — | 370 | — | 208 | — | — | — | — | — |
| Comparison Example 15 | Comparison Example 6 | 9.9 | 8.3 | 301 | 301 | 130 | * | 51 | 51 | 2.19 | 1.10 |
| Comparison Example 16 | Comparison Example 7 | 10.2 | 9.6 | 286 | 298 | 105 | — | 50 | 50 | 3.00 | — |
| Comparison Example 17 | Comparison Example 11 | 9.8 | * | 324 | * | 183 | * | 54 | * | — | — |
| Comparison Example 18 | Comparison Example 12 | 7.8 | 8.9 | 296 | 294 | 147 | 186 | 51 | 51 | 1.27 | 1.65 |
| Comparison Example 19 | Example 13 | 11.6 | 9.8 | 304 | 299 | 123 | 156 | 50 | 50 | 1.80 | — |

Note:
* : could not be tested due to high brittleness of the specimens

Table 3 clearly shows that the curing agents of the present invention (Examples 13 to 20) are extremely effective for producing cured epoxy resins having a very high thermal resistance and stability.

In Comparison Example 17, in which the conventional curing agent as that mentioned in Comparison Example 11 was used, it was found that when the epoxy resin composition was cured to prepare a number of test pieces, a considerable number of cured epoxy resin test pieces had large cracks and could not be used as test specimens. Some of the cured epoxy resin test pieces had no or small cracks and, therefore, could be subjected to the various tests mentioned hereinbefore. However, since the results of the tests were not reproducible, the results are shown in perentheses in Table 3.

Table 3 also shows that the cured epoxy resins of Comparative Examples 15 through 19 had a poor thermal resistance.

EXAMPLES 21 AND 22 AND COMPARISON EXAMPLE 20

In each of the Examples 21 and 22 and the Comparison Example 20, a number of test pieces were produced by using an epoxy resin composition which had been prepared by the same method as that mentioned in the Example specified in Table 4. The test pieces were divided into two groups. The first group of the test pieces were referred to as cured test specimens. The remaining group of the test pieces were treated in boiling water for 2 hours. This group of pieces were referred to as boiled test specimens.

In accordance with Japanese Industrial Standard Kb911, tests for measuring dielectric constant, dielectric loss tangent (tan δ) and volume resistivity were applied to the above-prepared first and second groups of test specimens. The results are shown in Table 4.

Table 4

| | | | Example No. | | |
|---|---|---|---|---|---|
| | | | Example 21 | Example 22 | Comparison Example 20 |
| Property | Test specimen | Testing temperature (°C.) | Epoxy resin composition prepared in | | |
| | | | Example 1 | Example 5 | Comparison Example 12 |
| Dielectric constant | cured | 20 | 4.1 | 3.9 | 4.3 |
| | | 200 | 4.6 | 4.2 | 4.9 |
| | boiled | about 70 | 4.4 | 4.2 | 4.4 |
| Tan δ (%) | cured | 20 | 1.2 | 0.78 | 1.2 |
| | | 200 | 1.8 | 1.0 | 1.6 |
| | boiled | about 70 | 1.7 | 0.96 | 1.3 |
| Volume resistivity (Ω-cm) | cured | 20 | $1.6 \times 10^{16}$ | $3.5 \times 10^{16}$ | $1.6 \times 10^{16}$ |
| | | 200 | $2.7 \times 10^{12}$ | $4.2 \times 10^{12}$ | $4.1 \times 10^{12}$ |
| | boiled | about 70 | $5.4 \times 10^{15}$ | $8.2 \times 10^{15}$ | $1.4 \times 10^{15}$ |

What we claim is:

1. An epoxy resin composition comprising at least one epoxy resin and a curing agent which comprises, as an essential curing component, 2,3,3',4'-biphenyltetracarboxylic dianhydride.

2. A composition as claimed in claim 1, wherein the ratio of the amount, in terms of acid anhydride equivalent, of said essential curing component to the amount, in terms of epoxy equivalent, of said epoxy resin is in a range of from 0.2 to 1.5, said ratio being calculated in accordance with the formula (I):

$$\text{Ratio} = \frac{A/A'}{B/B'} \quad (I)$$

wherein A represent an amount in grams of said essential curing component, A' represents a value of the acid anhydride equivalent of said essential curing component, B represents an amount in grams of said epoxy resin and B' represents a value of the epoxy equivalent of said epoxy resin.

3. A composition as claimed in claim 2, wherein said ratio of the formula (I) is in a range of from 0.25 to 1.4.

4. A composition as claimed in claim 2, wherein said curing agent consists of said essential curing component alone and the ratio of the formula (I) is in a range of from 0.45 to 1.5.

5. A composition as claimed in claim 1, wherein said curing agent comprises at least one additional curing component in addition to said essential curing component.

6. A composition as claimed in claim 5, wherein said additional curing component is a monoanhydride of an organic dicarboxylic acid.

7. A composition as claimed in claim 6, wherein said additional monoanhydride curing component is selected from the group consisting of monoanhydrides of maleic acid, phthalic acid, methyl-3,6-endomethylene tetrahydrophthalic acid, 3,6-endomethylene tetrahydrophthalic acid, tetrahydrophthalic acid, hexahydrophthalic acid, dodecylsuccinic acid and dichlorosuccinic acid.

8. A composition as claimed in claim 6, wherein the sum of the ratio of the amount, in terms of acid anhydrides equivalent, of said essential curing component to the amount, in terms of epoxy equivalent, of said epoxy resin, and the ratio of the amount, in terms of acid anhydride equivalent of said additional monoanhydride curing component to the amount, in terms of epoxy equivalent, of said epoxy resin, is in a range of from 0.45 to 1.4, the former ratio being calculated in accordance with the formula (I) and the latter ratio being calculated in accordance with the formula (II):

$$\text{Ratio} = \frac{C/C'}{B/B'} \quad (II)$$

wherein B/B' is the same as that defined above, C represents an amount in grams of the additional monoanhydride curing component and C' represents a value of acid anhydride equivalent of said additional monoanhydride curing component.

9. A composition as claimed in claim 8, wherein the ratio of the formula (II) is 0.9 or less.

10. A composition as claimed in claim 5, wherein said additional curing component is selected from the group consisting of, dianhydrides of organic tetracarboxylic acids different from 2,3,3',4'-biphenyltetracarboxylic dianhydride and aromatic polyamines.

11. A composition as claimed in claim 10, wherein the content of each of said additional dianhydride and aromatic polyamine curing components is 0.1 mole or less per epoxy equivalent of said epoxy resin.

12. A composition as claimed in claim 1, wherein said epoxy resin has an average molecular weight of from 100 to 20,000, and an average value of the epoxy equivalent of from 50 to 5000.

13. A composition as claimed in claim 12, wherein said epoxy resin is a bisphenol A type epoxy resin having an average molecular weight of from 200 to 10,000, and an average value of the epoxy equivalent of from 100 to 3000.

14. A composition as claimed in claim 1, wherein said curing agent is dissolved in said epoxy resin.

15. A method for curing an epoxy resin composition, comprising the steps of:

mixing at least one epoxy resin and a curing agent which comprises, as an essential curing component, 2,3,3',4'-biphenyltetracarboxylic dianhydride;

heating said resultant composition at a temperature of from 100° to 170° C. to dissolve said curing agent in said epoxy resin, and;

curing the above-heated epoxy resin composition at a temperature of from 80° C. to 300° C.

16. A method as claimed in claim 15, wherein said essential curing component to be mixed is in the form of fine particles having an average size of from 0.1 to 1000 microns.

17. A method as claimed in claim 15, wherein said curing agent consists of said essential curing component alone and said curing agent is dissolved in said epoxy resin at a temperature of from 150° to 170° C.

18. A method as claimed in claim 15, wherein the ratio of the amount, in terms of acid anhydride equivalent, of said essential curing component to the amount, in terms of epoxy equivalent, of said epoxy resin is in a range of from 0.2 to 1.5, said ratio being calculated in accordance with the formula (I):

$$\text{Ratio} = \frac{A/A'}{B/B'} \quad (I)$$

wherein A represents an amount in grams of said essential curing component, A' represents a value of the acid anhydride equivalent of said essential curing component, B represents an amount in grams of said epoxy resin and B' represents a value of the epoxy equivalent of said epoxy resin.

19. A method as claimed in claim 15, wherein said curing agent comprises at least one additional curing component in addition to said essential curing component.

20. A method as claimed in claim 19, wherein said additional curing component is a monoanhydride of an organic dicarboxylic acid.

21. A method as claimed in claim 20, wherein sum of the ratio of the amount, in terms of acid anhydrides equivalent, of said essential curing component to the amount, in terms of epoxy equivalent, of said epoxy resin, and the ratio of the amount, in terms of acid anhydride equivalent of said additional monoanhydride curing component to the amount, in terms of epoxy equivalent, of said epoxy resin, is in a range of from 0.45 to 1.4, the former ratio being calculated in accordance with the formula (I) and the latter ratio being calculated in accordance with the formula (II):

$$\text{Ratio} = \frac{C/C'}{B/B'} \quad (II)$$

wherein B/B' is the same as that defined above, C represents an amount in grams of the additonal monoanhydride curing component and C' represents a value of acid anhydride equivalent of said additional monoanhydride curing component.

22. A method as claimed in claim 21, wherein the ratio of the formula (II) is 0.9 or less.

23. A method as claimed in claim 15, wherein said curing operation is carried out, first, at a temperature of from 80° to 170° C. and, finally, at a temperature of from 150° to 250° C. and not lower than the first curing temperature.

24. A method as claimed in claim 15, wherein said heat-hardening operation is carried out, first, at a temperature of from 80° to 130° C., second, at a temperature of from 130° to 170° C. and, finally, at a temperature of from 150° to 250° C. and not lower than the second curing temperature.

* * * * *

UNITED STATES PATENT OFFICE
CERTIFICATE OF CORRECTION

PATENT NO. : 4,180,607                                Page 1 of 2

DATED : December 25, 1979

INVENTOR(S) : Ichiro Sasaki, et al

It is certified that error appears in the above-identified patent and that said Letters Patent are hereby corrected as shown below:

Column 4, line 2: "whre" should be --where--.

Column 6, line 26: "whihc" should be --which--.

line 41: "reins" should be --resins--.

line 45: "acceleraters" should be --accelerators--.

Column 7, line 3: "accelerater" should be --accelerator--.

line 20: "antimoney" should be --antimony--.

line 37: "carried" should be --carry--.

Column 9, line 27: "corboxylic" should be --carboxylic--.

Columns 9-10, Table 1: Insert the heading "Curing agent" above the columns entitled "Essential curing component" and "Additional monoanhydride curing component".

Column 10, lines 12-13: "hisphenol" should be --bisphenol--.

line 19: "hisphenol" should be --bisphenol--.

UNITED STATES PATENT AND TRADEMARK OFFICE
CERTIFICATE OF CORRECTION

PATENT NO. : 4,180,607

DATED : December 25, 1979

INVENTOR(S) : Ichiro Sasaki, et al

It is certified that error appears in the above—identified patent and that said Letters Patent is hereby corrected as shown below:

Column 11, Table 2, at approximately line 33, the first footnote: "5-BPDA" should be --s-BPDA--.

Signed and Sealed this

Seventeenth Day of June 1980

[SEAL]

Attest:

SIDNEY A. DIAMOND

Attesting Officer

Commissioner of Patents and Trademarks